(12) United States Patent
Kim et al.

(10) Patent No.: US 12,037,449 B2
(45) Date of Patent: Jul. 16, 2024

(54) POLYESTER FILM, PREPARATION METHOD THEREOF AND METHOD FOR REPRODUCING POLYETHYLENETEREPHTHALATE CONTAINER USING SAME

(71) Applicants: SK microworks Co., Ltd., Gyeonggi-do (KR); SK Microworks America, Inc., Covington, GA (US)

(72) Inventors: Chul Kyu Kim, Gyeonggi-do (KR); Eugene Jung, Lawrenceville, GA (US); Yong Deuk Kim, Gyeonggi-do (KR); Joo Ho Yang, Gyeonggi-do (KR); Hyuk Soo Lee, Gyeonggi-do (KR)

(73) Assignees: SK MICROWORKS CO., LTD., Gyeonggi-Do (KR); SK MICROWORKS AMERICA, INC., Covington, GA (US)

( * ) Notice: Subject to any disclaimer, the term of this patent is extended or adjusted under 35 U.S.C. 154(b) by 486 days.

(21) Appl. No.: 17/293,580

(22) PCT Filed: Oct. 29, 2020

(86) PCT No.: PCT/KR2020/014956
§ 371 (c)(1),
(2) Date: May 13, 2021

(87) PCT Pub. No.: WO2021/086082
PCT Pub. Date: May 6, 2021

(65) Prior Publication Data
US 2022/0002477 A1    Jan. 6, 2022

Related U.S. Application Data

(60) Provisional application No. 62/928,913, filed on Oct. 31, 2019.

(30) Foreign Application Priority Data

Oct. 28, 2020    (KR) .......................... 10-2020-0141579

(51) Int. Cl.
| | | |
|---|---|---|
| C08J 5/18 | (2006.01) |
| B29B 17/04 | (2006.01) |
| B29C 48/00 | (2019.01) |
| B29C 48/08 | (2019.01) |
| C08G 63/181 | (2006.01) |
| C08G 63/183 | (2006.01) |
| C08J 7/04 | (2020.01) |

(52) U.S. Cl.
CPC ............ *C08G 63/183* (2013.01); *B29B 17/04* (2013.01); *B29B 17/0412* (2013.01); *B29C 48/0018* (2019.02); *B29C 48/08* (2019.02); *C08G 63/181* (2013.01); *C08J 5/18* (2013.01); *C08J 7/0427* (2020.01); *B29B 2017/0436* (2013.01); *B29B 2017/0468* (2013.01); *C08J 2367/02* (2013.01); *C08J 2467/02* (2013.01)

(58) Field of Classification Search
USPC .................................................. 528/271, 272
See application file for complete search history.

(56) References Cited

U.S. PATENT DOCUMENTS

| | | | |
|---|---|---|---|
| 6,663,928 B2 † | 12/2003 | Ito | |
| 8,632,865 B2 † | 1/2014 | Kim | |
| 11,155,691 B2 | 10/2021 | Kim et al. | |
| 2012/0226014 A1 | 9/2012 | Lee et al. | |
| 2014/0069587 A1 | 3/2014 | Rackovan et al. | |
| 2015/0076744 A1 | 3/2015 | Clark | |
| 2017/0232721 A1 | 8/2017 | Lim et al. | |
| 2018/0273231 A1* | 9/2018 | Yamamoto | .............. B29B 17/02 |
| 2019/0352032 A1 | 11/2019 | Kim et al. | |
| 2021/0394468 A1† | 12/2021 | Peters | |

FOREIGN PATENT DOCUMENTS

| | | | |
|---|---|---|---|
| AU | 2019226120 B2 | 7/2020 |
| CN | 108908922 A | 11/2018 |
| EP | 0924678 A2 | 6/1999 |
| EP | 3357690 A1 | 8/2018 |
| JP | 2001-058622 A | 3/2001 |
| JP | 2001058622 A * | 3/2001 |
| JP | 2005-290079 A | 10/2005 |
| JP | 2013-510919 A | 3/2013 |
| JP | 2017-526557 A | 9/2017 |
| KR | 2002-0062838 A | 7/2002 |

(Continued)

OTHER PUBLICATIONS

JP2001058622A_machine_translation (Year: 2001).*
Extended European Search Report issued by the European Patent Office on Jan. 18, 2022.
Office Action on the Brazilian Patent Application No. 112021010601-4 issued by the Brazilian Patent Office on Sep. 26, 2023.
Office Action for the Japanese Patent Application No. 2021-523167 issued by the Japanese Patent Office on Jul. 25, 2023.

(Continued)

*Primary Examiner* — Terressa Boykin
(74) *Attorney, Agent, or Firm* — IP & T GROUP LLP

(57) ABSTRACT

Embodiments relate to a polyester film, preparation method thereof and method for reproducing polyethyleneterephthalate (PET) container using same, the crystallization temperature (Tc) of the polyester film is not measured or is 70° C. to 130° C., as measured by differential scanning calorimetry, whereby it is possible to easily control the crystallinity. Accordingly, the polyester film has excellent shrinkage characteristics and recyclability, and clumping rarely occurs even if it is dried at high temperatures for a long period of time in the regeneration process.

7 Claims, 6 Drawing Sheets

(56) References Cited

FOREIGN PATENT DOCUMENTS

| | | |
|---|---|---|
| KR | 10-0981129 B1 | 9/2010 |
| KR | 10-1771171 B1 | 8/2017 |
| KR | 10-2017-0129094 A | 11/2017 |
| KR | 10-2019-0059216 A | 5/2019 |
| WO | 2005/121230 A1 | 12/2005 |
| WO | 2008/017843 A1 | 2/2008 |
| WO | 2017/057463 A1 | 4/2017 |
| WO | 2020/076747 A1 | 4/2020 |

OTHER PUBLICATIONS

Office Action for application 2021-529073 issued by the Japanese Intellectual Property Office on May 24, 2022.

\* cited by examiner
† cited by third party

[Fig. 1A]
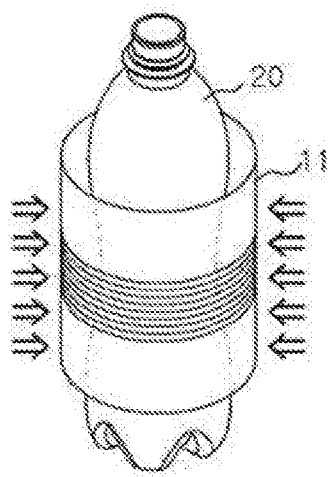
[Fig. 1B]
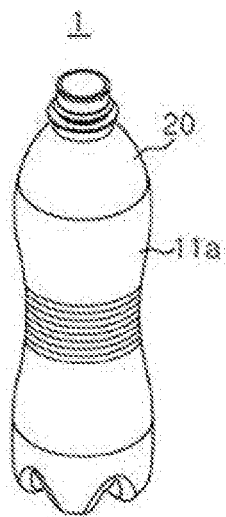

[Fig. 2A]
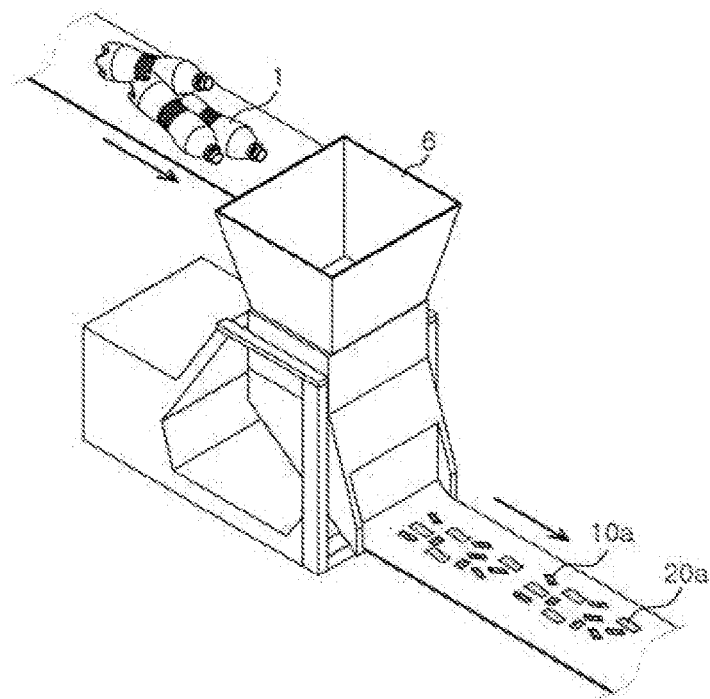
[Fig. 2B]
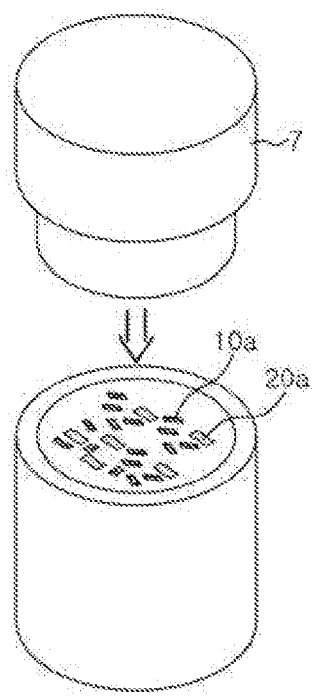

[Fig. 2C]
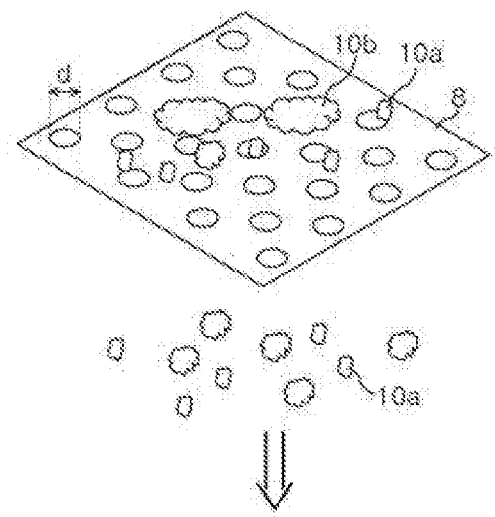
[Fig. 3A]
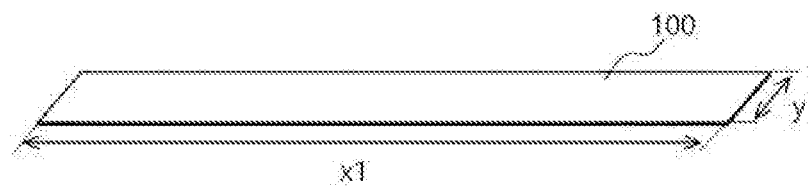
[Fig. 3B]
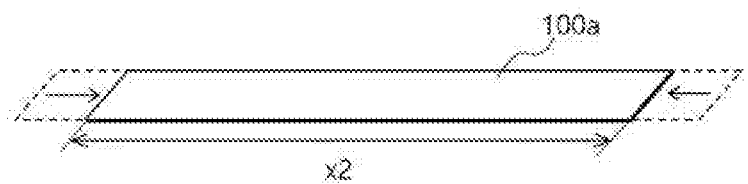

[Fig. 4A]
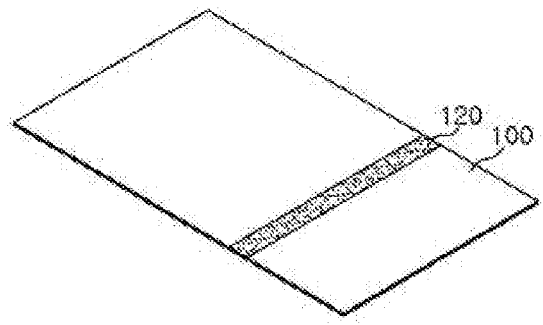
[Fig. 4B]
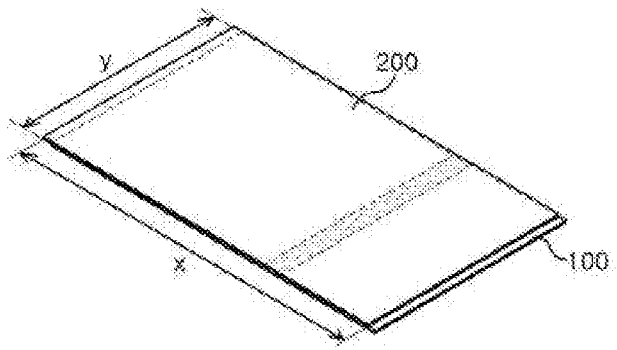
[Fig. 4C]
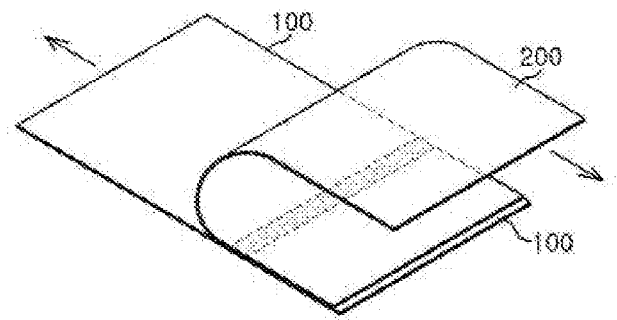

[Fig. 5A]
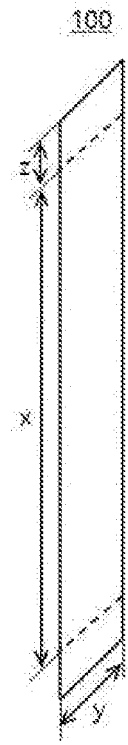
[Fig. 5B]
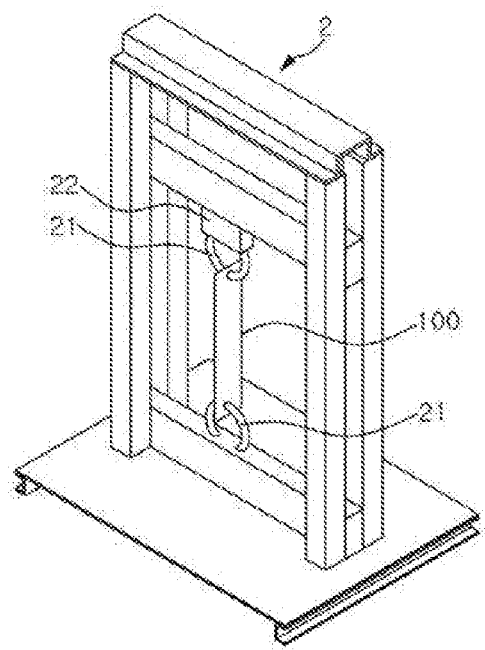

[Fig. 5C]
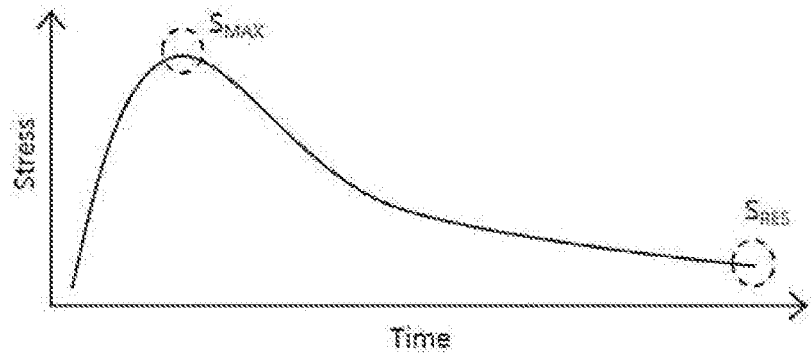
[Fig. 6A]
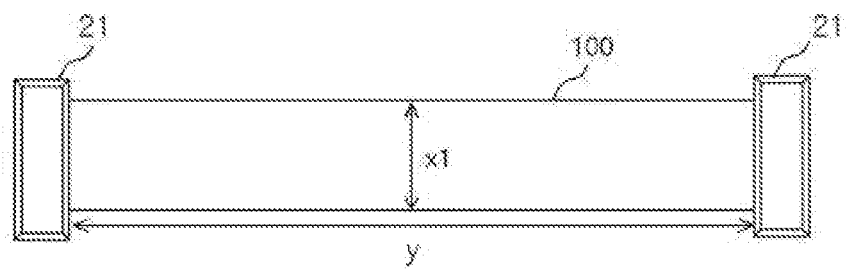
[Fig. 6B]
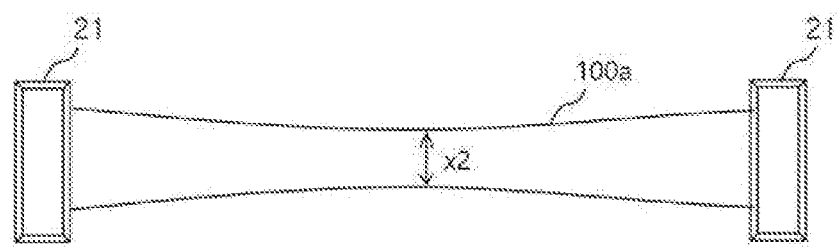

POLYESTER FILM, PREPARATION METHOD THEREOF AND METHOD FOR REPRODUCING POLYETHYLENETEREPHTHALATE CONTAINER USING SAME

CROSS-REFERENCE TO RELATED APPLICATIONS

This application is a national stage application of PCT/KR2020/014956 filed on Oct. 29, 2020, which claims the benefit of U.S. provisional application No. 62/928,913 filed on Oct. 31, 2019 and Korean patent application number 10-2020-0141579 filed on Oct. 28, 2020. The disclosure of each of the foregoing applications is incorporated herein by reference in its entirety.

TECHNICAL FIELD

Embodiments relate to a polyester film, to a process for preparing the same, and to a process for regenerating a polyethylene terephthalate container using the same. Specifically, the embodiments relate to a polyester film having excellent recyclability by virtue of controlled crystallinity, to a process for preparing the same, and to a process for regenerating a polyethylene terephthalate (PET) container provided with such a polyester film.

BACKGROUND ART

In recent years, as containers for beverages or foods are manufactured in various forms, or there are increased cases in which full packaging is applied in order to attract the attention of consumers, heat shrinkable labels and packaging materials are attracting attention. A heat shrinkable label or packaging material takes advantage of the feature of a polymer film that tends to shrink to a shape before stretching thereof at a certain temperature or higher once it has been oriented by stretching thereof. In a typical process of heat shrinkage labeling or packaging, a heat shrinkable film is cut, printed in a desired design, rolled up, bonded at both ends with an adhesive solvent, loosely wrapped around a container, and then shrunk as heat is applied thereto.

A film used in the above heat shrinkage process is required to have not only such basic properties as thermal resistance, chemical resistance, weatherability, and printability, but also container sealability, heat shrinkage uniformity, running characteristics in the longitudinal direction, and crack resistance. Conventionally, polyvinyl chloride films, polystyrene films, polypropylene films, and the like have been used for this heat shrinking process. In recent years, polyester films having such properties as high thermal resistance and weatherability, convenience of incineration, and excellent printability have been widely used.

However, since a conventional polyester film has a fast shrinkage speed and a high shrinkage stress, there have been defects caused by non-uniform shrinkage or distortions of a plastic container. Thus, Korean Laid-open Patent Publication No. 2002-0062838 discloses a technique in which 5% by weight or more of a polyester elastomer is added to a heat shrinkable polyester film to suppress the occurrence of wrinkles, shrinkage stains, distortions, and the like when the film is used for full packaging of plastic bottles.

As such, polyester films used in the heat shrinkage process are prepared with lower crystallinity by blending a soft component with a polyester resin. In addition, they have been developed to have thermal properties such as shrinkage rate and shrinkage stress with respect to temperature, chemical resistance suitable for the seaming process, and recyclability that has recently emerged due to a waste plastic problem.

In addition, as concerns about environmental problems have increased in recent years, there is a demand for addressing the recycling issues of products fabricated using thermoplastic polymers. In particular, polyethylene terephthalate (PET), a thermoplastic resin having excellent properties in terms of thermal resistance, processability, transparency, and non-toxicity, has been widely used for producing a wide range of products such as films, fibers, bottles, containers, and the like, and efforts have been continued to enhance the regeneration ratio thereof.

PRIOR ART DOCUMENT

Patent Document (Patent Document 1) Korean Laid-open Patent Publication No. 2002-0062838

DISCLOSURE OF INVENTION

Technical Problem

Accordingly, the embodiments aim to provide a polyester film having excellent shrinkage characteristics by virtue of controlled crystallinity and excellent recyclability, whereby non-uniform clumping rarely occurs even if it is dried at high temperatures for a long period of time in the thermal treatment thereof, a process for preparing the same, and a process for regenerating a polyethylene terephthalate container using the same.

Solution to Problem

According to an embodiment, there is provided a polyester film, which comprises a copolymerized polyester resin in which a diol and a dicarboxylic acid are copolymerized, wherein the crystallization temperature (Tc) of the film is not measured or is 70° C. to 130° C. by differential scanning calorimetry, and when the flakes obtained by crushing a polyethylene terephthalate (PET) container provided with the polyester film are thermally treated at a temperature of 210° C. for 90 minutes, the clumping ratio is 10% or less.

According to another embodiment, there is provided a process for preparing a polyester film, which comprises preparing a copolymerized polyester resin in which a diol and a dicarboxylic acid are copolymerized; melt-extruding the copolymerized polyester resin at a temperature of 250° C. to 300° C. to prepare an unstretched sheet; and stretching the unstretched sheet at a temperature of 70° C. to 100° C. and then heat-setting it at a temperature of 65° C. to 90° C. to prepare a polyester film, wherein the crystallization temperature (Tc) of the polyester film is not measured or is 70° C. to 130° C. by differential scanning calorimetry, and when the flakes obtained by crushing a polyethylene terephthalate (PET) container provided with the polyester film are thermally treated at a temperature of 210° C. for 90 minutes, the clumping ratio is 10% or less.

According to still another embodiment, there is provided a process for regenerating a polyethylene terephthalate container, which comprises providing a polyethylene terephthalate (PET) container provided with the polyester film; crushing the polyethylene terephthalate (PET) container provided with the polyester film to obtain flakes; and thermally treating the flakes to produce regenerated polyester chips, wherein when the flakes are thermally treated at a temperature of 210° C. for 90 minutes, the clumping ratio is 10% or less, and the flakes comprise first flakes obtained by crushing the polyethylene terephthalate (PET) container and second flakes obtained by crushing the polyester film.

Advantageous Effects of Invention

In the polyester film according to an embodiment, the crystallization temperature (Tc) is not measured or is 70° C. to 130° C., as measured by differential scanning calorimetry, whereby it is possible to easily control the crystallinity thereof. Accordingly, non-uniform clumping is suppressed even if it is dried at high temperatures for a long period of time in the regeneration process, whereby it can be applied to the regeneration process.

In addition, since the clumping ratio is very low, it is possible to enhance recyclability while environmental pollution is prevented, and the quality, yield, and productivity of regenerated polyester chips produced through the regeneration process of the polyethylene terephthalate container using the polyester film can be enhanced.

Further, the process for regenerating a polyethylene terephthalate container according to the embodiment does not require a separate step of separating a container and a film. Thus, it is economical since time and cost are saved.

BRIEF DESCRIPTION OF DRAWINGS

FIGS. 1A and 1B show a polyester film applied to a product before and after heat shrinkage thereof.

FIGS. 2A, 2B and 2C show a method of measuring the clumping of a polyethylene terephthalate container provided with a polyester film in Test Example 2-1.

FIGS. 3A and 3B show a method of measuring the heat shrinkage of a polyester film in Test Example 1-2.

FIGS. 4A, 4B and 4C show a method of measuring the adhesive characteristics of a polyester film by a solvent.

FIGS. 5A, 5B and 5C show a method of measuring the shrinkage stress of a polyester film.

FIGS. 6A and 6B show a method of measuring the skirt ratio of a polyester film.

EXPLANATION OF REFERENCE NUMERALS d: diameter of a hole
x: first dimension
x1: first dimension before shrinkage
x1: first dimension after shrinkage
y: second dimension
z: third dimension
$S_{MAX}$: maximum stress
$S_{RES}$: residual stress
1: product with a label
2: stress tester
6: crusher
7: compressing weight
8: sieve
10a: second flakes
10b: clumped mixed flakes
11: label (before shrinkage)
11a: label after shrinkage
20: product
20a: first flakes
21: zig
22: load cell 100: (first) polyester film (before shrinkage)
100a: polyester film after shrinkage
120: adhesive part
200: second polyester film

BEST MODE FOR CARRYING OUT THE INVENTION

Hereinafter, the present invention will be described in detail with reference to embodiments. The embodiments are not limited to those described below. Rather, they can be modified into various forms as long as the gist of the invention is not altered.

Throughout the present specification, when a part is referred to as "comprising" an element, it is understood that other elements may be comprised, rather than other elements are excluded, unless specifically stated otherwise.

All numbers and expressions related to the quantities of components, reaction conditions, and the like used herein are to be understood as being modified by the term "about," unless otherwise indicated.

Throughout the present specification, the terms first, second, and the like are used to describe various components. But the components should not be limited by the terms. The terms are used only for the purpose of distinguishing one component from another.

Since it is difficult to recycle heat shrinkable labels or packaging materials composed of a polyester film despite their excellent thermal properties and chemical resistance, most of them are disposed of after use. This is because, when a polyester film is introduced into the current recycling process, that is, the regeneration process, the polyester film causes various process defects during a high-temperature process for a long period of time, resulting in an increase in costs. Or even if it is recyclable, there is a problem that the seaming characteristics are poor due to the high crystallinity of a polyester film when it is applied to the variable sleeve offset printing (VSOP) method.

In addition, once a polyethylene terephthalate (PET) container recycled from the consumers has been washed and crushed, it is then subjected to liquid specific gravity separation, dehydration, drying, and/or wind specific gravity separation in order to remove a large amount of films contained in the crushed product and then to such an additional step as pelletization to obtain regenerated polyester chips. However, it is difficult to completely remove the films used as a label for polyethylene terephthalate (PET) containers even after the above process. The regenerated polyester chips may be colored due to the inks contained in the films. In addition, there has been a problem in that the regenerated polyester chips are non-uniformly clumped during the regeneration process, particularly the thermal treatment process, due to the thermal properties of the films.

Accordingly, a method of using a film made of a low specific gravity polymer such as polystyrene, polyethylene, polypropylene, and the like as a label has been proposed in order to readily carry out the specific gravity separation. However, the low specific gravity thereof cannot be effectively achieved due to the ink layer, which still makes it difficult to completely separate and remove the films, and the problem that the residual ink colors the regenerated polyester chips cannot be solved.

The polyester film according to an embodiment has excellent shrinkage characteristics and seaming characteristics in various printing methods by virtue of controlled crystallinity and excellent recyclability, whereby non-uniform clumping rarely occurs even if it is dried at high temperatures for a long period of time in the regeneration process. Accordingly, it is possible to enhance the quality, yield, and productivity of regenerated polyester chips produced from the polyester film or through the regeneration process of a polyethylene terephthalate (PET) container using the polyester film.

Polyester Film

According to an embodiment, there is provided a polyester film, which comprises a copolymerized polyester resin in which a diol and a dicarboxylic acid are copolymerized, wherein the crystallization temperature (Tc) of the film is not measured or is 70° C. to 130° C. by differential scanning calorimetry, and when the flakes obtained by crushing a polyethylene terephthalate (PET) container provided with the polyester film are thermally treated at a temperature of 210° C. for 90 minutes, the clumping ratio is 10% or less.

The crystallization temperature (Tc) of the polyester film according to an embodiment is not measured or is 70° C. to 130° C. by differential scanning calorimetry. For example, the crystallization temperature (Tc) of the film is not measured or may be 80° C. to 130° C., 85° C. to 125° C., 90° C. to 123° C., 96° C. to 120° C., 98° C. to 120° C., or 99.5° C. to 118° C., as measured by differential scanning calorimetry. Since the crystallization temperature is adjusted to the above range, it is possible to effectively control the crystallinity of the polyester film, whereby the clumping ratio is very low in the regeneration process of the film or a polyethylene terephthalate (PET) container comprising the film. Thus, it is possible to prevent environmental pollution while the recyclability is enhanced.

The differential scanning calorimeter (DSC) may be specifically a modulated differential scanning calorimeter (modulated DSC or MDSC), more specifically a temperature-modulated differential scanning calorimeter (TMDSC).

Specifically, the crystallization temperature may be measured by scanning at a temperature elevation rate of 10° C./min using a differential scanning calorimeter (DSC) mode. The first endothermic temperature is a glass transition temperature (Tg), the exothermic temperature measured after the Tg is a crystallization temperature (Tc), and the endothermic temperature measured after the Tc is a melting point (Tm) in the measurement result. The integral at Tc is calculated as the heat of crystallization. The larger the value of the heat of crystallization, the faster the crystallization rate and the higher the transfer rate to a crystalline phase.

In addition, when the flakes obtained by crushing a polyethylene terephthalate (PET) container provided with the polyester film are thermally treated at 210° C. for 90 minutes, the clumping ratio may be 10% or less. For example, the clumping ratio may be 8% or less, 6% or less, 5% or less, 4% or less, preferably, 3% or less, 2% or less, 1.5% or less, 1% or less, 0.8% or less, or 0.5% or less.

The clumping refers to an aggregate that may be formed in the regeneration process. The size of the aggregate may be, for example, at least three times the size of the flake particles before the thermal treatment. The clumping ratio refers to the fraction of the aggregates based on the total weight of the flakes before the thermal treatment.

Specifically, in the regeneration process of a polyethylene terephthalate (PET) container in which a film is provided as a label, the flakes obtained by crushing them are passed through a sieve and then subjected to a thermal treatment process. In such event, aggregates may be formed as the flakes are clumped, which aggregate is called clumping. The aggregates formed are again filtered through a sieve, and the weight is measured. The weight ratio of the aggregates based on the total weight of the flakes before the thermal treatment is calculated as a clumping ratio. Thus, the higher the value of the clumping ratio, the lower the recyclability.

Since the polyester film according to an embodiment is effectively controlled in crystallinity, there are no wrinkles when applied as a label for a polyethylene terephthalate (PET) container or distortions of the polyethylene terephthalate container. In addition, even if the flakes crushed together with the polyethylene terephthalate container upon completion of its use are thermally treated during the regeneration process, the clumping ratio is very low. Thus, it is possible to enhance the recyclability, as well as to enhance the quality, yield, and productivity of regenerated polyester chips produced by recycling.

If plastic flakes are fused to form clumping in the regeneration process, it may cause various problems. Thus, the U.S. Association of Plastic Recyclers (APR) is preparing a procedure (APR PET-S-08) to evaluate a clumping ratio. Specifically, when 3 parts by weight of a polyester film and 97 parts by weight of a polyethylene terephthalate container are crushed to a particle diameter of 9.5 mm or less, respectively, and are thermally treated for 90 minutes at a temperature of 210° C. under a pressure of 8.7 kPa (i.e., a load of 2.5 kgf applied to a cylinder having a diameter of 6 cm), the clumping ratio may refer to the ratio of clumps that fail to pass through a sieve with a hole size of 11.2 mm (or a 0.625" sieve).

In addition, the polyester film may have a melting point (Tm) of 170° C. or higher as measured by differential scanning calorimetry. For example, the melting point may be 175° C. or higher, 180° C. or higher, or 190° C. or higher, 170° C. to 240° C., 175° C. to 235° C., 180° C. to 235° C., 185° C. to 230° C., 190° C. to 225° C., or 195° C. to 225° C.

If the melting point of the polyester film exceeds the above range, the adhesive strength of the polyester film by a solvent is lowered, so that it may be difficult to be used in the seaming process. If the melting temperature is lower than the above range, the clumping ratio may increase.

Specifically, if the crystallization temperature of the polyester film is 96° C. to 120° C. and the melting point is 170° C. or higher, more preferably, if the crystallization temperature of the polyester film is 96° C. to 120° C. and the melting point is 190° C. or higher, it is possible to maximize the effect of preventing the clumping phenomenon that may occur in the regeneration process.

In addition, the heat of crystallization of the film may be 0.01 J/g to 50 J/g as measured at the crystallization temperature (Tc). For example, the heat of crystallization of the film may be 0.01 J/g to 40 J/g, 0.05 J/g to 30 J/g, 0.1 J/g to 20 J/g, 0.1 J/g to 10 J/g, 0.1 J/g to 8 J/g, 0.2 J/g to 6 J/g, or 0.3 J/g to 5.7 J/g, as measured at the crystallization temperature (Tc). Since the heat of crystallization satisfies the above range, it is possible to effectively control the crystallinity of the polyester film, whereby the clumping ratio is very low in the regeneration process of the film or a polyethylene terephthalate (PET) container comprising the film. Thus, it is possible to prevent environmental pollution while the recyclability is enhanced.

In addition, in the polyester film according to an embodiment, the shrinkage rate in the main shrinkage direction with respect to temperature may be adjusted within a specific range. For example, when the shrinkage rate in the main shrinkage direction of the polyester film upon thermal treatment at a temperature of X° C. for 10 seconds is defined as $T_X$, the ranges of $T_{70}$, $T_{80}$, $T_{90}$, and $T_{100}$ may be adjusted.

The thermal treatment for obtaining $T_X$ may specifically refer to immersing the polyester film in hot water at X° C. for 10 seconds.

Specifically, the film may have a heat shrinkage rate ($T_{70}$) of 0% to 50% in a first direction upon thermal treatment at a temperature of 70° C. for 10 seconds. For example, $T_{70}$ may be 0% or more, 5% or more, 10% or more, 15% or more, or 20% or more, and 50% or less, 40% or less, 35% or less, 30% or less, 25% or less, or 20% or less.

In the present specification, the first direction may be the transverse direction (TD) or the longitudinal direction (MD), and a second direction perpendicular to the first direction may be the longitudinal direction (MD) or the transverse direction (TD). Specifically, the first direction may be the main shrinkage direction. More specifically, the first direction may be the transverse direction (TD) as the main shrinkage direction, and the second direction may be the longitudinal direction (MD).

In addition, the film may have a heat shrinkage rate ($T_{80}$) of 30% or more in a first direction upon thermal treatment at a temperature of 80° C. for 10 seconds. For example, $T_{80}$ may be 35% or more, 45% or more, 50% or more, or 55% or more, and may be 30% to 85%, 40% to 80%, 50% to 80%, 55% to 75%, or 58% to 71%. Since the heat shrinkage rate in the first direction upon thermal treatment at 80° C. for 10 seconds satisfy the above range, it is convenient to conduct labeling in the process in which the film surrounds at least a portion of a container. Specifically, there are no wrinkles when the film is applied as a label for a polyethylene terephthalate (PET) container or distortions of the polyethylene terephthalate container.

The film may have a heat shrinkage rate ($T_{90}$) of 50% or more in a first direction upon thermal treatment at a temperature of 90° C. for 10 seconds. For example, $T_{90}$ may be 55% or more, 60% or more, or 65% or more, and may be 50% to 90%, 60% to 85%, 65% to 83%, or 69% to 80%. Since the heat shrinkage rate in the first direction upon thermal treatment at 90° C. for 10 seconds satisfy the above range, it is convenient to conduct labeling in the process in which the film surrounds at least a portion of a container. Specifically, there are no wrinkles when the film is applied as a label for a polyethylene terephthalate (PET) container or distortions of the polyethylene terephthalate container.

The film may have a heat shrinkage rate ($T_{100}$) of 40% to 90% in a first direction upon thermal treatment at a temperature of 100° C. for 10 seconds. For example, $T_{100}$ may be 40% or more, 50% or more, 60% or more, or 70% or more, and 90% or less, 85% or less, 80% or less, 75% or less, or 70% or less. That is, the polyester film may have a heat shrinkage rate of 50% to 80% in the first direction upon thermal treatment at a temperature of 100° C. for 10 seconds.

Meanwhile, in the polyester film according to an embodiment, the shrinkage rate in the first direction and the second direction perpendicular to the first direction with respect to temperature may be adjusted within a specific range. For example, when the shrinkage rate in the second direction of the polyester film upon thermal treatment at a temperature of X° C. for 10 seconds is defined as $T_X'$, the ranges of $T_{70}'$, $T_{75}'$, $T_{80}'$, $T_{90}'$, and $T_{100}'$ may be adjusted within specific ranges. The thermal treatment for obtaining $T_X'$ may refer to immersing the polyester film in hot water at X° C. for 10 seconds.

$T_{70}'$, $T_{75}'$, $T_{80}'$, $T_{90}'$, and $T_{100}'$ of the polyester film may each independently be −10% to 10%. For example, $T_{70}'$, $T_{75}'$, $T_{80}'$, $T_{90}'$, and $T_{100}'$ of the polyester film may each be −10% or more, −8% or more, −6% or more, −4% or more, −2% or more, 0% or more, and 10% or less, 8% or less, 6% or less, 4% or less, or 2% or less.

The polyester film according to an embodiment may have excellent adhesive strength by a solvent, that is, seaming characteristics.

For example, the polyester film may have a peel strength of 300 gf/in or more after adhesion by 1,3-dioxolane. Specifically, the peel strength after adhesion by 1,3-dioxolane may be 300 gf/in or more, 400 gf/in or more, 500 gf/in or more, 600 gf/in or more, or 700 gf/in or more, and 3,000 gf/in or less, 2,500 gf/in or less, 2,000 gf/in or less, or 1,500 gf/in or less. If the peel strength of the polyester film is adjusted to the above range, the polyester film may be proper to be used in the seaming process thereof.

The peel strength may be measured under the conditions that a solvent is applied on to a polyester film, another sheet of the polyester film is laminated thereon, a pressure of 160 Pa is applied to the area where the solvent has been applied for 1 hour, and the polyester films are then delaminated at a speed of 300 mm/min and an angle of 180°.

FIGS. 4A, 4B and 4C show a method of measuring the adhesive characteristics of a polyester film by a solvent. For example, 1,3-dioxolane was applied to a first polyester film (100) in the form of a band having a width of 2 mm to form an adhesive part (120) with an area of 0.6 cm². A second polyester film (200) was attached thereon, a weight of 2 kg was placed on the adhesive part (120), and it was aged for 1 hour. The two polyester films were delaminated at a speed of 300 mm/min and an angle of 180° during which the maximum force was measured. The polyester film was cut to a rectangle having dimensions (x, y) of 9 cm in length and 3 cm in width.

In the polyester film according to an embodiment, the shrinkage stress in the main shrinkage direction may be adjusted within a specific range. For example, the maximum stress in the main shrinkage direction of the polyester film upon thermal treatment at a temperature of 90° C. for 1 minute may be 7.0 N or 6.0 N. In addition, the residual stress in the main shrinkage direction of the polyester film upon thermal treatment at a temperature of 90° C. for 1 minute may be 6.0 N or 5.5 N.

The thermal treatment for obtaining the shrinkage stress may specifically refer to immersing the polyester film in hot water at 90° C. for 1 minute while it is fixed in the main shrinkage direction. In addition, in the curve of the stress with respect to time obtained in the shrinkage process, the stress at the highest point may be the maximum stress, and the stress at the end of the shrinkage time may be the residual stress.

FIGS. 5A, 5B and 5C show a method of measuring the shrinkage stress of a polyester film. For example, the first polyester film (100) was cut to have an initial dimension (x) of 110 mm in the direction to be measured, an extra dimension (z) of 5 mm at both ends, and a dimension (y) of 15 mm in the direction perpendicular thereto (FIG. 5A). The cut film was set in a stress tester (2), and both ends of the film were fixed to jigs (21) at an interval of 100 mm (FIG. 5B). The stress tester (2) in which the film had been set was immersed in a water bath at 90° C. for 1 minute, and the maximum stress ($S_{MAX}$) in the shrinkage process and the residual stress after shrinkage ($S_{RES}$) were measured with a load cell (22) (FIG. 5C).

In the polyester film according to an embodiment, the skirt ratio may be adjusted within a specific range. Specifically, a polyester film is fixed in the main shrinkage direction, and the length before and after shrinkage in the direction perpendicular to the main shrinkage direction of the polyester film is measured. The skirt ratio may be calculated as a ratio obtained by dividing the difference in length measured before and after shrinkage by the length of the film in the main shrinkage direction. More specifically, the polyester film may have a skirt ratio of 17.4% upon thermal treatment at a temperature of 90° C. for 10 seconds.

FIGS. 6A and 6B show a method of measuring the skirt ratio of a polyester film. For example, the polyester film (100) was cut to an initial dimension (x1) of 60 mm in the direction to be measured and fixed to a heat setting frame having a width (y) of 115 mm with jigs (21) (FIG. 6A). It was immersed in a water bath at 90° C. for 10 seconds, and the reduced dimension (x2) was then measured (FIG. 6B). In the present specification, it was fixed in the transverse direction (TD) as the main shrinkage direction, and the length after shrinkage in the longitudinal direction (MD) perpendicular thereto was measured for the calculation according to the following equation.

$$\Delta SR \text{ (mm)} = x1 \text{ (mm)} - x2 \text{ (mm)}$$

$$SR \% \text{ (\%)} = \Delta SR \text{ (mm)}/y \text{ (mm)} \times 100$$

In addition, the film may have a glass transition temperature (Tg) of 60° C. or higher as measured by differential scanning calorimetry. For example, the film may have a glass transition temperature of 60° C. or higher, 65° C. or higher, 70° C. to less than 80° C., or 70° C. to 75° C., as measured by differential scanning calorimetry.

The film may have a light transmittance of 90% or more at a wavelength of 550 nm. Specifically, the light transmittance of the film measured at a wavelength of 550 nm before and after immersion in an aqueous solution of sodium hydroxide (NaOH) having a concentration of 1% at 85° C. may be 90.5% or more, 91% or more, 92% or more, or 93% or more, respectively.

In addition, the change in light transmittance of the film before and after immersion in an aqueous solution of sodium hydroxide (NaOH) having a concentration of 1% at 85° C. may be 0.7% or less. For example, the change in light transmittance of the film before and after the immersion may be 0.6% or less or 0.5% or less.

The change in light transmittance refers to an absolute value of the difference between the light transmittance of the film measured at a wavelength of 550 nm before the immersion and the light transmittance of the film measured at a wavelength of 550 nm after the immersion.

In addition, the change ($\Delta L$) in Col-L may be 0.7 or less, the change ($\Delta a$) in Col-a may be 0.5 or less, and the change ($\Delta b$) in Col-b may be 0.5 or less, before and after immersion of the film in an aqueous solution of sodium hydroxide (NaOH) having a concentration of 1% at 85° C. For example, the change ($\Delta L$) in Col-L may be 0.65 or less, 0.6 or less, 0.55 or less, or 0.5 or less, the change ($\Delta a$) in Col-a may be 0.3 or less, 0.1 or less, 0.08 or less, 0.06 or less, or 0.05 or less, and the change ($\Delta b$) in Col-b may be 0.3 or less, 0.1 or less, 0.08 or less, or 0.07 or less, before and after the immersion.

The change ($\Delta L$) in Col-L refers to an absolute value of the difference between the Col-L value before the immersion and the Col-L value after the immersion, the change ($\Delta a$) in Col-a refers to an absolute value of the difference between the Col-a value before the immersion and the Col-a value after the immersion, and the change ($\Delta b$) in Col-b refers to an absolute value of the difference between the Col-b value before the immersion and the Col-b value after the immersion.

Col-L, Col-a, and Col-b are color coordinates established by the Commission International d'Eclairage (CIE), where color is represented by L (brightness), a (green to red complementary color), and b (yellow to blue complementary color). They can be measured using UltraScan PRO (manufacturer: Hunterlab), but it is not limited thereto.

The polyester film according to an embodiment comprises a copolymerized polyester resin. Specifically, the copolymerized polyester resin may be one in which two or three or more diols and a dicarboxylic acid are polymerized. More specifically, it may be a copolymerized polyethylene terephthalate (Co-PET) resin.

Specifically, the diol may comprise at least one selected from the group consisting of ethylene glycol, diethylene glycol, neopentyl glycol, propanediol unsubstituted or substituted with an alkyl group, butanediol unsubstituted or substituted with an alkyl group, pentanediol unsubstituted or substituted with an alkyl group, hexanediol unsubstituted or substituted with an alkyl group, octanediol unsubstituted or substituted with an alkyl group, and a combination thereof.

For example, the diol may comprise at least one selected from the group consisting of ethylene glycol, diethylene glycol, neopentyl glycol, 1,3-propanediol, 1,2-octanediol, 1,3-octanediol, 2,3-butanediol, 1,3-butanediol, 1,4-butanediol, 1,5-pentanediol, 2-butyl-2-ethyl-1,3-propanediol, 2,2-diethyl-1,5-pentanediol, 2,4-diethyl-1,5-pentanediol, 3-methyl-1,5-pentane diol, and 1,1-dimethyl-1,5-pentane diol.

The dicarboxylic acid may comprise an aromatic dicarboxylic acid, an aliphatic dicarboxylic acid, an alicyclic dicarboxylic acid, or an ester thereof.

For example, the dicarboxylic acid may be terephthalic acid, dimethylterephthalic acid, isophthalic acid, naphthalene dicarboxylic acid, orthophthalic acid, adipic acid, azelaic acid, sebacic acid, decanedicarboxylic acid, an ester thereof, or a combination thereof. Specifically, the dicarboxylic acid may comprise at least one selected from the group consisting of terephthalic acid, dimethyl terephthalate, naphthalene dicarboxylic acid, and orthophthalic acid.

According to an embodiment, the copolymerized polyester resin may be one in which two or three or more diols and an aromatic dicarboxylic acid are polymerized. Specifically, the copolymerized polyester resin may be one in which diols comprising ethylene glycol and at least one comonomer and an aromatic dicarboxylic acid are polymerized.

The diol may comprise ethylene glycol and at least one comonomer selected from the group consisting of neopentyl glycol and diethylene glycol.

Specifically, the diol may comprise ethylene glycol in an amount of 50% by mole to 90% by mole based on the total number of moles of the diol. For example, the diol may comprise ethylene glycol in an amount of 60% by mole to 90% by mole, 65% by mole to 88% by mole, 68% by mole to 85% by mole, 70% by mole to 83% by mole, or 71% by mole to 80% by mole, based on the total number of moles of the diol.

In addition, the diol may comprise at least one comonomer selected from the group consisting of neopentyl glycol and diethylene glycol in an amount of 15% by mole or more. For example, the diol may comprise at least one comonomer selected from the group consisting of neopentyl glycol and diethylene glycol in an amount of 17% by mole or more, 19% by mole or more, 20% by mole or more, 15% by mole to 50% by mole, 15% by mole to 40% by mole, 17% by mole to 35% by mole, 19% by mole to 30% by mole, or 20% by mole to 29% by mole, based on the total number of moles of the diol. Since the content of the comonomer satisfies the above range, it is possible to more effectively control the crystallinity while the heat shrinkage rate in the main shrinkage direction is excellent.

In addition, if the content of the comonomer is less than the above range, the heat shrinkage characteristics of the polyester film may be deteriorated. Specifically, the heat shrinkage rate of the polyester film in the main shrinkage direction may not be sufficient at a specific temperature, and the heat shrinkage rate of the polyester film in the direction perpendicular to the main shrinkage direction may be too large at a particular temperature.

Specifically, the diol may comprise diethylene glycol as a comonomer. For example, the content of diethylene glycol in the diol may be 1% by mole to 10% by mole, 1% by mole to 8% by mole, 3% by mole to 6% by mole, or 3.5% by mole to 5.5% by mole.

Specifically, the diol may comprise neopentyl glycol as a comonomer. For example, the content of neopentyl glycol in the diol may be 5% by mole to 35% by mole, 7% by mole to 33% by mole %, 10% by mole to 30% by mole, 13% by mole to 28% by mole, or 15% by mole to 25% by mole.

Since the content of neopentyl glycol satisfies the above range, the heat shrinkage rate in a first direction or in a second direction perpendicular to the first direction is readily adjusted when the film is thermally shrunk, so that it is possible to more effectively prevent wrinkles or deformation when the film is applied to a container.

In addition, the polyester resin may further comprise a monohydric alcohol in addition to the diol component. For example, the monohydric alcohol may be methanol, ethanol, isopropyl alcohol, allyl alcohol, or benzyl alcohol. Specifically, the polyester resin may comprise a monohydric alcohol in an amount of 10 to 30% by mole, 13 to 25% by mole, or 15 to 22% by mole, based on the total number of moles of the diol component and the monohydric alcohol, but it is not limited thereto.

The dicarboxylic acid may comprise an aromatic dicarboxylic acid. For example, the dicarboxylic acid may comprise terephthalic acid or dimethyl terephthalic acid in an amount of 80% by mole or more, 90% by mole or more, 95% by mole or more, 99% by mole or more, or 100% by mole, based on the total number of moles of the dicarboxylic acid.

The diol and the dicarboxylic acid are subjected to a transesterification reaction and then polymerization to thereby form a copolymerized polyester resin.

Specifically, at least one catalyst selected from manganese acetate, calcium acetate, and zinc acetate may be used as a catalyst for the transesterification reaction. The content of the catalyst may be 0.02 part by weight to 0.2 part by weight, 0.02 part by weight to 0.1 part by weight, or 0.05 part by weight to 0.08 part by weight, based on the total weight of the dicarboxylic acid.

In addition, upon completion of the transesterification reaction, at least one additive selected from the group consisting of silica, potassium, and magnesium; a stabilizer such as trimethyl phosphate; a polymerization catalyst such as antimony trioxide and tetrabutylene titanate; and the like may be selectively added.

The polyester film may have a thickness of 10 μm to 100 μm. For example, the thickness of the base layer may be 20 μm to 80 μm, 30 μm to 70 μm, 35 μm to 65 μm, 35 μm to 55 μm, 40 μm to 60 μm, or 35 μm to 45 μm.

Process for Preparing a Polyester Film

According to another embodiment, there is provided a process for preparing a polyester film, which comprises preparing a copolymerized polyester resin in which a diol and a dicarboxylic acid are copolymerized; melt-extruding the copolymerized polyester resin at a temperature of 250° C. to 300° C. to prepare an unstretched sheet; and stretching the unstretched sheet at a temperature of 70° C. to 100° C. and then heat-setting it at a temperature of 65° C. to 90° C. to prepare a polyester film, wherein the crystallization temperature (Tc) of the polyester film is not measured or is 70° C. to 130° C. by differential scanning calorimetry, and when the flakes obtained by crushing a polyethylene terephthalate (PET) container provided with the polyester film are thermally treated at a temperature of 210° C. for 90 minutes, the clumping ratio is 10% or less.

The composition and process conditions are adjusted such that the polyester film finally produced by the above process satisfies the characteristics (crystallization temperature, shrinkage characteristics, and the like) as discussed above. Specifically, in order for the final polyester film to satisfy the characteristics as discussed above, the composition of the copolymerized polyester resin is adjusted, the extrusion temperature, the casting temperature, the preheating temperature at the time of stretching, the stretching ratio in each direction, the stretching temperature, the stretching speed, and the like are adjusted, or thermal treatment and relaxation is carried out after stretching while the thermal treatment temperature and relaxation rate are adjusted.

Hereinafter, each step will be described in more detail.

First, a copolymerized polyester resin is prepared. Details on the copolymer polyester resin are as described above.

Specifically, the polymerization of the copolymerized polyester resin may be carried out through a conventional transesterification reaction and polycondensation reaction. In such event, the diol and dicarboxylic acid components used and their contents are as exemplified above.

Thereafter, the copolymerized polyester resin may be melt-extruded at a temperature of 250° C. to 300° C. or 260° C. to 280° C. and then cooled to obtain an unstretched sheet. The unstretched sheet is passed through a chamber to be preheated while it is conveyed at a speed of 10 m/minute to 110 m/minute, 25 m/minute to 90 m/minute, 40 m/minute to 80 m/minute, or 50 m/minute to 60 m/minute.

The preheating may be carried out at 90° C. to 120° C. for 0.01 minute to 1 minute. For example, the preheating temperature (T1) may be 95° C. to 115° C. or 97° C. to 113° C., and the preheating time may be 0.05 minute to 0.5 minute or 0.08 minute to 0.2 minute.

Thereafter, the preheated unstretched sheet is stretched at a temperature of 70° C. to 95° C.

Specifically, the stretching may be uniaxial stretching or biaxial stretching. Specifically, the stretching may be uniaxial stretching carried out in the transverse direction (TD), or biaxial stretching carried out in the longitudinal direction (MD) and then in the transverse direction (TD).

The stretching may be carried out at a temperature lower than the preheating temperature (T1) by 10° C. to 20° C. For example, the stretching may be carried out at 70° C. to 100° C., 75° C. to 100° C., 80° C. to 98° C., or 83° C. to 96° C.

In addition, if the stretching is uniaxial stretching, the stretching may be carried out in the transverse direction (TD) at a stretching ratio of 3.5 times to 5 times, 3.5 times to 4.8 times, or 3.8 times to 4.6 times. In addition, if the stretching is biaxial stretching, the stretching may be carried out in the longitudinal direction (MD) at a stretching ratio of 1.1 times to 2 times or 1.1 times to 1.5 times, and then in the transverse direction (TD) at a stretching ratio of 3.5 times to 5 times, 3.5 times to 4.8 times, or 3.8 times to 4.6 times.

In addition, a coating step may be further carried out after the stretching. Specifically, a coating step may be further carried out before the uniaxial stretching in the transverse direction (TD) or before stretching in the transverse direction after stretching in the longitudinal direction. More specifically, a coating step may be further carried out for forming a promoting layer or the like capable of imparting functionality such as antistatic or the like to the film. The coating step may be carried out by spin coating or in-line coating, but it is not limited thereto.

Thereafter, the stretched sheet is heat-set at a temperature of 65° C. to 90° C. to prepare a polyester film.

The heat setting may be annealing and carried out at a temperature of 65° C. to 90° C. for 0.01 minute to 1 minute. For example, the heat setting temperature (T2) may be 65° C. to 85° C. or 69° C. to 81° C., and the heat setting time may be 0.05 minute to 0.5 minute or 0.08 minute to 0.2 minute.

Process for Regenerating a Polyethylene Terephthalate Container

According to still another embodiment, there is provided a process for regenerating a polyethylene terephthalate container, which comprises providing a polyethylene terephthalate (PET) container provided with the polyester film; crushing the polyethylene terephthalate (PET) container provided with the polyester film to obtain flakes; and thermally treating the flakes to produce regenerated polyester chips, wherein when the flakes are thermally treated at a temperature of 210° C. for 90 minutes, the clumping ratio is 10% or less, and the flakes comprise first flakes obtained by crushing the polyethylene terephthalate (PET) container and second flakes obtained by crushing the polyester film.

In order to regenerate a polyethylene terephthalate (PET) container according to an embodiment, a polyethylene terephthalate (PET) container at least a portion of which is surrounded by the polyester film is prepared.

Conventionally adopted was a process, which comprises washing recycled waste products in which containers, metals, glass, and plastics may be intermingled to classify polyester containers and removing the films or like wrapping the containers in order to enhance the recyclability and quality of the containers. The removal step has been carried out by mechanically tearing or cutting the films or by such an additional step as liquid specific gravity separation, dehydration, drying, wind specific gravity separation, or pelletization.

However, it was difficult to completely remove the films in the above removal step. In particular, it was difficult to enhance the quality of the regenerated polyester chips thus produced due to the residual ink that had been formed on the films.

In the process for regenerating a polyester container according to an embodiment, it is possible to produce regenerated polyester chips without an additional step of removing the film surrounding the polyethylene terephthalate (PET) container, whereby the cost is saved.

In the polyethylene terephthalate (PET) container, the polyester film is provided on the outer surface of the container. Specifically, the outer surface of the polyethylene terephthalate container is covered with the polyester film, and the film may be shrunk by steam or hot air to surround at least a portion of the outer surface of the polyethylene terephthalate container. For example, the polyester film, as a heat shrinkable film, may be a label of the polyethylene terephthalate container, but it is not limited thereto.

Details on the polyester film are as described above.

Thereafter, the polyethylene terephthalate (PET) container provided with the film is crushed to obtain flakes.

Specifically, at least a portion of the outer surface of the polyethylene terephthalate (PET) container is surrounded by the film, and the container and the film are crushed together to obtain flakes without a step of separating the container and the film.

That is, the flakes comprise first flakes obtained by crushing the polyester container and second flakes obtained by crushing the film.

The particle size of the first flakes may be 0.1 mm to 25 mm, and the particle size of the second flakes may be 0.1 mm to 25 mm. For example, the particle size of the first flakes may be 0.3 mm to 23 mm, 0.5 mm to 20 mm, 1 mm to 20 mm, 0.5 mm to 15 mm, 0.5 mm to 13 mm, 1 mm to 18 mm, 1 mm to 15 mm, 1 mm to 13 mm, or 2 mm to 10 mm, and the particle size of the second flakes may be 0.3 mm to 23 mm, 0.5 mm to 20 mm, 1 mm to 20 mm, 0.5 mm to 15 mm, 0.5 mm to 13 mm, 1 mm to 18 mm, 1 mm to 15 mm, 1 mm to 13 mm, or 2 mm to 10 mm, but they are not limited thereto.

Thereafter, a step of washing the crushed flakes may be further carried out before the thermal treatment step. Specifically, the washing step may be carried out with a washing solution containing water and/or an aqueous solution of 1 part by weight of sodium hydroxide at a temperature of 85° C. to 90° C.

For example, the crushed flakes may be first washed with water, second washed with the washing solution, and then third washed again with water. As the washing step is carried out, it is possible to remove impurities that may remain in the crushed flakes, as well as to effectively remove the ink component. Thus, it is possible to enhance the quality and purity of the regenerated polyester chips thus produced, thereby maximizing the recyclability.

In addition, after the washing step, a step of drying the washed flakes may be further carried out at 60° C. to 175° C. for 10 minutes to 30 minutes. For example, the drying step may be carried out at 65° C. to 175° C., 70° C. to 170° C., 90° C. to 165° C., 100° C. to 165° C., or 120° C. to 165° C., 140° C. to 165° C., or 150° C. to 165° C. for 10 minutes to 85 minutes, 10 minutes to 70 minutes, or 15 minutes to 30 minutes.

The washing and drying steps may be carried out once to five times repeatedly. For example, impurities remaining in the flakes can be effectively removed by repeatedly carrying out the washing and drying steps two to five times or three to five times in order.

Finally, the flakes are thermally treated to produce regenerated polyester chips.

Specifically, the flakes comprise first flakes obtained by crushing the polyethylene terephthalate (PET) container and second flakes obtained by crushing the polyester film.

The thermal treatment may be carried out at 200° C. to 220° C. for 60 minutes to 120 minutes. For example, the thermal treatment may be carried out at 200° C. to 215° C. or 205° C. to 220° C. for 70 minutes to 120 minutes or 80 minutes to 120 minutes.

In addition, when the flakes are thermally treated at a temperature of 210° C. for 90 minutes, the clumping ratio is 10% or less. Thus, since the clumping ratio that may be caused as the first flakes and the second flakes are entangled together is low, the quality of regenerated chips prepared is excellent. Specifically, since the flakes comprise second flakes obtained by crushing the polyester film according to an embodiment, it is possible to effectively reduce or prevent the formation of aggregates, thereby enhancing the quality of regenerated polyester chips thus produced.

Regenerated polyester chips may be obtained after the thermal treatment step. Specifically, the regenerated polyester chips that comprise the first flakes and the second flakes may be obtained after the thermal treatment step. For example, the flakes may be melt-extruded and cut to obtain regenerated polyester chips, but it is not limited thereto.

Regenerated Polyester Chips

According to still another embodiment, there are provided regenerated polyester chips produced by the process for regenerating a polyethylene terephthalate container.

Specifically, the regenerated polyester chips may comprise first flakes comprising polyethylene terephthalate (PET) and second flakes comprising a polyester resin.

The regenerated polyester chips may have an intrinsic viscosity (IV) of 0.55 dl/g or more. For example, the regenerated polyester chips may have an intrinsic viscosity (IV) of 0.58 dl/g or more, or 0.59 dl/g or more, 0.55 dl/g to 3.0 dl/g, 0.55 dl/g to 2.0 dl/g, 0.55 dl/g to 1.0 dl/g, 0.58 dl/g to 0.85 dl/g, or 0.58 dl/g 0.7 dl/g.

In addition, the regenerated polyester chips may comprise polyethylene terephthalate in an amount of 70% by weight to 99% by weight and a copolymerized polyester resin in an amount of 1% by weight to 30% by weight, based on the total weight of regenerated polyester chips. For example, the regenerated polyester chips may comprise polyethylene terephthalate in an amount of 80% by weight to 99% by weight, 90% by weight to 99% by weight, or 95% by weight to 99% by weight and a copolymerized polyester resin in an amount of 1% by weight to 20% by weight, 1% by weight to 10% by weight, or 1% by weight to 5% by weight, based on the total weight of the regenerated polyester chips.

MODE FOR THE INVENTION

Hereinafter, the present invention will be described in more detail with reference to the following examples. However, these examples are set forth to illustrate the present invention, and the scope of the present invention is not limited thereto.

EXAMPLE

Preparation of a Polyester Film

Example 1-1

(1) Preparation of a Copolymerized Polyester Resin

An autoclave equipped with a stirrer and a distillation column was charged with terephthalic acid (TPA) as a dicarboxylic acid and ethylene glycol (EG) and a comonomer as a diol. 0.07 part by weight of manganese acetate as a transesterification catalyst was added per 100 parts by weight of the dicarboxylic acid, followed by heating the mixture to 220° C. and the removal of methanol produced as a byproduct to carry out the reaction.

Upon completion of the transesterification reaction, 0.07 part by weight of silica having an average particle diameter of 0.28 μm was added per 100 parts by weight of the dicarboxylic acid, and 0.4 part by weight of trimethyl phosphate as a stabilizer was added. After 5 minutes, 0.035 part by weight of antimony trioxide and 0.005 part by weight of tetrabutylene titanate were added as a polymerization catalyst, followed by stirring for 10 minutes. Subsequently, the reaction mixture was transferred to a second reactor equipped with a vacuum apparatus. The pressure was gradually reduced while the temperature was raised to 285° C., and the polymerization was carried out for about 210 minutes to thereby prepare a copolymerized polyester resin.

(2) Preparation of a Film

The copolymerized polyester resin prepared in step (1) was extruded at 270° C. through a T-die, which was cooled to obtain an unstretched sheet. Thereafter, the unstretched sheet was passed through a roll while it was conveyed at a speed of 55 m/min to thereby adjust the thickness thereof. The unstretched sheet was preheated at 105° C. for 0.1 minute while it was conveyed at a speed of 55 m/minute and stretched 4.3 times in the transverse direction (TD) at 83° C. Thereafter, the stretched sheet was heat set at 69° C. for about 0.1 minute to prepare a polyester film having a thickness of 40 μm.

Examples 1-2 to 1-6 and Comparative Example 1-1

Polyester films were prepared in the same manner as in Example 1-1, except that the components, contents, and process conditions were changed as shown in Table 1 below.

TABLE 1

| | TPA (% by mole) | EG (% by mole) | NPG (% by mole) | CHEM (% by mole) | DEG (% by mole) | Stretching temp. (° C.) | Heat-setting temp. (° C.) |
|---|---|---|---|---|---|---|---|
| Ex. 1-1 | 100 | 72 | 24 | — | 4 | 83 | 69 |
| Ex. 1-2 | 100 | 80 | 16 | — | 4 | 88 | 75 |
| Ex. 1-3 | 100 | 80 | 16 | — | 4 | 90 | 71 |
| Ex. 1-4 | 100 | 80 | 16 | — | 4 | 90 | 80 |
| Ex. 1-5 | 100 | 78 | 17 | — | 5 | 96 | 81 |
| Ex. 1-6 | 100 | 71 | 24 | — | 5 | 85 | 70 |
| C. Ex. 1-1 | 100 | 70 | — | 25 | 5 | 96 | 81 |

* NPG: neopentyl glycol
* CHDM: 1.4-cyclohexanedimethanol
* DEG: diethylene glycol Test Example 1-1: Tc, Tm, and Heat of Crystallization 4 mg of a sample of the polyester films prepared in Examples 1-1 to 1-6 and Comparative Example 1-1 was scanned in a differential scanning calorimeter (DSC) mode at a temperature elevation rate of 10° C./min using a differential scanning calorimeter (Q2000, manufacturer: TA Instruments).

The first endothermic temperature was a glass transition temperature (Tg), the exothermic temperature measured after the Tg was a crystallization temperature (Tc), and the endothermic temperature measured after the Tc was a melting point (Tm) in the measurement result. The integral at Tc was calculated as the heat of crystallization. The larger the value of the heat of crystallization, the faster the crystallization rate and the higher the transfer rate to a crystalline phase.

Test Example 1-2: Heat Shrinkage Rate

FIGS. 3A and 3B show a method of measuring the heat shrinkage of a polyester film. Referring to FIGS. 3A and 3B, the polyester films (100) prepared in Examples 1-1 to 1-6 and Comparative Example 1-1 were each cut to 300 mm in the direction to be measured and 15 mm in the direction perpendicular thereto. Here, 300 mm was the first dimension (x1) before shrinkage, and 15 mm was the second dimension (FIG. 3A).

The cut polyester film (100) was immersed in a water bath heated at 80° C. or 90° C. for 10 seconds, and the shrunk dimension of the polyester film (100a) after shrinkage, that is, the first dimension after shrinkage (x2) was measured (FIG. 3B) and calculated according to the following equation. The heat shrinkage rate (%) in this test example was obtained in the main shrinkage direction (TD) of the film.

Heat shrinkage rate (%)=(x1−x2)/x1×100

TABLE 2

|  | TD thermal shrinkage rate (%) (80° C.) | TD thermal shrinkage rate (%) (90° C.) | Tc (° C.) | Heat of crystallization (J/g) | Tm (° C.) |
| --- | --- | --- | --- | --- | --- |
| Ex. 1-1 | 69.7% | 79.3% | 99.5 | 5.7 | 210.2 |
| Ex. 1-2 | 60.7% | 69.7% | 101.1 | 4.0 | 208.2 |
| Ex. 1-3 | 63.3% | 75.7% | 99.9 | 4.5 | 223.9 |
| Ex. 1-4 | 59.4% | 71.7% | 99.9 | 4.5 | 223.9 |
| Ex. 1-5 | 58.0% | 70.0% | — | — | 199 |
| Ex. 1-6 | 70.7% | 78.8% | 115.8 | 5.0 | 185.1 |
| C. Ex. 1-1 | 68.0% | 78.0% | 82.0 | 0.1 | 166 |

As shown in Table 2, in the polyester films of Examples 1-1 to 1-6, the heat shrinkage with respect to each temperature in the main shrinkage direction (TD), the crystallization temperature (Tc), heat of crystallization, and melting point (Tm) fell within the preferred ranges.

Preparation of Regenerated Polyester Chips

Example 2-1

(1) Preparation of a Polyethylene Terephthalate Container Provided with a Polyester Film A part of the outer surface of a polyethylene terephthalate container (PET container, 30 g) was wrapped with the polyester film prepared in Example 1-1. In such event, it was fixed using an acrylic adhesive. Thereafter, the polyester film of Example 1-1 was shrunk at a temperature of 90° C. under a hot air condition to obtain a polyethylene terephthalate container provided with a polyester film.

(2) Regeneration Process of a Polyethylene Terephthalate Container

The container provided with a polyester film prepared in step (1) was crushed with a crusher to obtain flakes. The flakes were first washed with water. Thereafter, the flakes were second washed for 15 minutes with a washing solution (a mixture of a solution of 0.3% by weight of Triton X-100 and a solution of 1.0% by weight of NaOH) stirred in a bath at 88° C. and 880 rpm. Thereafter, the second washed flakes were third washed with water at room temperature to remove the residual washing solution and dried at 160° C. for 20 minutes.

Thereafter, they were thermally treated at 210° C. for 90 minutes to produce regenerated polyester chips.

Examples 2-2 to 2-8 and Comparative Examples 2-1

Regenerated polyester chips were prepared in the same manner as in Example 2-1, except that the polyester films of Examples 1-2 to 1-6 and Comparative Example 1-1 were each used instead of the polyester film of Example 1-1.

Test Example 2-1: Clumping Ratio

The clumping ratio (%) was measured according to the procedure for polyethylene terephthalate flake clumping evaluation (APR PET-S-08) of the U.S. Association of Plastic Recyclers (APR).

FIGS. 2A, 2B and 2C show a method of measuring the clumping of a polyethylene terephthalate (PET) container provided with a polyester film.

As shown in FIG. 2A, an article (1) in which a polyester film is provided as a label (11a) in a polyethylene terephthalate (PET) container (20) was crushed in a crusher (6) and passed through a sieve (0.374" sieve, not shown) having a hole size is 9.5 mm to obtain mixed flakes composed of 97 g of first flakes (20a) obtained by crushing polyethylene terephthalate (PET) and 3 g of second flakes (10a) obtained by crushing a polyester film.

Thereafter, as shown in FIG. 2B, the mixed flakes were placed on a cylinder having a diameter of 6 cm and a height of 8 cm, and a compressing weight (7) of 2.5 kg was placed thereon to apply a load. Thereafter, the cylinder with the weight thereon was thermally treated in a convection oven at 210° C. for 90 minutes and then cooled at room temperature.

Thereafter, as shown in FIG. 2C, the cooled mixed flakes were placed on a second sieve (8; 0.625" sieve) with a hole diameter (d) of 11.2 mm and filtered, and the aggregated mixed flakes (10b) remaining on the second sieve (8) were collected and weighed.

Clumping ratio (%)=weight of aggregated mixed flakes/weight of initial mixed flakes×100

Test Example 2-2: Intrinsic Viscosity

The regenerated polyester chips prepared in Examples 2-1 to 2-6 and Comparative Example 2-1 were dissolved in ortho-chlorophenol at 100° C., and the relative viscosity was measured with an Ostwald viscometer at 35° C. in a thermostatic bath by measuring the time for the sample to drop. Thereafter, the intrinsic viscosity (IV) of the value corresponding to the obtained relative viscosity was confirmed in Table 3 below and rounded to the third decimal place.

TABLE 3

| No. | Relative viscosity | Intrinsic viscosity |
| --- | --- | --- |
| 1 | 1.840 | 0.590 |
| 2 | 1.841 | 0.591 |
| 3 | 1.842 | 0.591 |
| 4 | 1.843 | 0.592 |
| 5 | 1.844 | 0.592 |
| 6 | 1.845 | 0.593 |
| 7 | 1.846 | 0.594 |
| 8 | 1.847 | 0.594 |
| 9 | 1.848 | 0.595 |
| 10 | 1.849 | 0.595 |
| 11 | 1.850 | 0.596 |
| 12 | 1.851 | 0.597 |
| 13 | 1.852 | 0.597 |
| 14 | 1.853 | 0.598 |
| 15 | 1.854 | 0.599 |
| 16 | 1.855 | 0.599 |
| 17 | 1.856 | 0.600 |
| 18 | 1.857 | 0.600 |
| 19 | 1.858 | 0.601 |
| 20 | 1.859 | 0.602 |
| 21 | 1.860 | 0.602 |
| 22 | 1.861 | 0.603 |
| 23 | 1.862 | 0.603 |
| 24 | 1.863 | 0.604 |
| 25 | 1.864 | 0.605 |
| 26 | 1.865 | 0.605 |
| 27 | 1.866 | 0.606 |
| 28 | 1.867 | 0.607 |
| 29 | 1.868 | 0.607 |
| 30 | 1.869 | 0.608 |
| 31 | 1.870 | 0.608 |

TABLE 3-continued

| No. | Relative viscosity | Intrinsic viscosity |
|---|---|---|
| 32 | 1.871 | 0.609 |
| 33 | 1.872 | 0.610 |
| 34 | 1.873 | 0.610 |
| 35 | 1.874 | 0.611 |
| 36 | 1.875 | 0.611 |
| 37 | 1.876 | 0.612 |
| 38 | 1.877 | 0.613 |
| 39 | 1.878 | 0.613 |
| 40 | 1.879 | 0.614 |
| 41 | 1.880 | 0.615 |
| 42 | 1.881 | 0.615 |
| 43 | 1.882 | 0.616 |
| 44 | 1.883 | 0.616 |
| 45 | 1.884 | 0.617 |
| 46 | 1.885 | 0.618 |
| 47 | 1.886 | 0.618 |
| 48 | 1.887 | 0.619 |
| 49 | 1.888 | 0.619 |
| 50 | 1.889 | 0.620 |
| 51 | 1.890 | 0.621 |
| 52 | 1.891 | 0.621 |
| 53 | 1.892 | 0.622 |
| 54 | 1.893 | 0.622 |
| 55 | 1.894 | 0.623 |
| 56 | 1.895 | 0.624 |
| 57 | 1.896 | 0.624 |
| 58 | 1.897 | 0.625 |
| 59 | 1.898 | 0.625 |
| 60 | 1.899 | 0.626 |
| 61 | 1.900 | 0.627 |
| 62 | 1.901 | 0.627 |
| 63 | 1.902 | 0.628 |
| 64 | 1.903 | 0.629 |
| 65 | 1.904 | 0.629 |
| 66 | 1.905 | 0.630 |
| 67 | 1.906 | 0.630 |
| 68 | 1.907 | 0.631 |
| 69 | 1.908 | 0.631 |
| 70 | 1.909 | 0.632 |
| 71 | 1.910 | 0.633 |
| 72 | 1.911 | 0.633 |
| 73 | 1.912 | 0.634 |
| 74 | 1.913 | 0.635 |
| 75 | 1.914 | 0.635 |
| 76 | 1.915 | 0.636 |
| 77 | 1.916 | 0.636 |
| 78 | 1.917 | 0.637 |
| 79 | 1.918 | 0.637 |
| 80 | 1.919 | 0.638 |
| 81 | 1.920 | 0.639 |
| 82 | 1.921 | 0.639 |
| 83 | 1.922 | 0.640 |
| 84 | 1.923 | 0.641 |
| 85 | 1.924 | 0.641 |
| 86 | 1.925 | 0.642 |
| 87 | 1.926 | 0.642 |
| 88 | 1.927 | 0.643 |
| 89 | 1.928 | 0.644 |
| 90 | 1.929 | 0.644 |
| 91 | 1.930 | 0.645 |
| 92 | 1.931 | 0.645 |
| 93 | 1.932 | 0.646 |
| 94 | 1.933 | 0.647 |
| 95 | 1.934 | 0.647 |
| 96 | 1.935 | 0.648 |
| 97 | 1.936 | 0.648 |
| 98 | 1.937 | 0.649 |
| 99 | 1.938 | 0.650 |
| 100 | 1.939 | 0.650 |
| 101 | 1.940 | 0.651 |
| 102 | 1.941 | 0.651 |
| 103 | 1.942 | 0.652 |
| 104 | 1.943 | 0.653 |
| 105 | 1.944 | 0.653 |
| 106 | 1.945 | 0.654 |
| 107 | 1.946 | 0.654 |
| 108 | 1.947 | 0.655 |
| 109 | 1.948 | 0.656 |
| 110 | 1.949 | 0.656 |
| 111 | 1.950 | 0.657 |
| 112 | 1.951 | 0.657 |
| 113 | 1.952 | 0.658 |
| 114 | 1.953 | 0.659 |
| 115 | 1.954 | 0.659 |
| 116 | 1.955 | 0.660 |
| 117 | 1.956 | 0.660 |
| 118 | 1.967 | 0.667 |
| 119 | 1.968 | 0.667 |
| 120 | 1.969 | 0.668 |

TABLE 4

|  | Clumping ratio (%) | Intrinsic viscosity (dl/g) |
|---|---|---|
| Ex. 2-1 | 0 | 0.59 |
| Ex. 2-2 | 0.3 | 0.60 |
| Ex. 2-3 | 0 | 0.65 |
| Ex. 2-4 | 0 | 0.61 |
| Ex. 2-5 | 0.7 | 0.60 |
| Ex. 2-6 | 3.5 | 0.60 |
| C. Ex. 2-1 | 22.6 | 0.65 |

As shown in Table 4, the regenerated polyester chips of Examples 2-1 to 2-6 satisfying the specific range of crystallization temperature (Tc) and the specific range of melting point (Tm) of Table 2 had a very low clumping ratio in a similar intrinsic viscosity range as compared with Comparative Example 2-1, which is advantageous for long-term high-temperature drying in the regeneration process, whereby it is possible to enhance the recyclability.

The invention claimed is:

1. A polyester film, which comprises a copolymerized polyester resin in which a diol and a dicarboxylic acid are copolymerized,
    wherein the crystallization temperature (Tc) of the film is not measured or is 70° C. to 130° C. by differential scanning calorimetry,
    when the flakes obtained by crushing a polyethylene terephthalate (PET) container provided with the polyester film are thermally treated at a temperature of 210° C. for 90 minutes, the clumping ratio is 10% or less, and
    the diol comprises neopentyl glycol in an amount of 5% by mole to 35% by mole based on the total number of moles of the diol.

2. The polyester film of claim 1, wherein the crystallization temperature (Tc) is 96° C. to 120° C. and the melting point (Tm) is 170° C. or higher as measured by differential scanning calorimetry.

3. The polyester film of claim 1, wherein the clumping ratio is 5% or less.

4. The polyester film of claim 1, wherein the heat of crystallization at the crystallization temperature (Tc) is 0.01 J/g to 50 J/g.

5. The polyester film of claim 1, which has a heat shrinkage rate of 30% or more in a first direction upon thermal treatment at a temperature of 80° C. for 10 seconds.

6. The polyester film of claim 1, wherein the diol comprises ethylene glycol and at least one comonomer selected from the group consisting of neopentyl glycol and diethylene glycol in an amount of 15% by mole or more.

7. The polyester film of claim 6, wherein the diol further comprises diethylene glycol in an amount of 1% by mole to 10% by mole.

* * * * *